Figure 1:
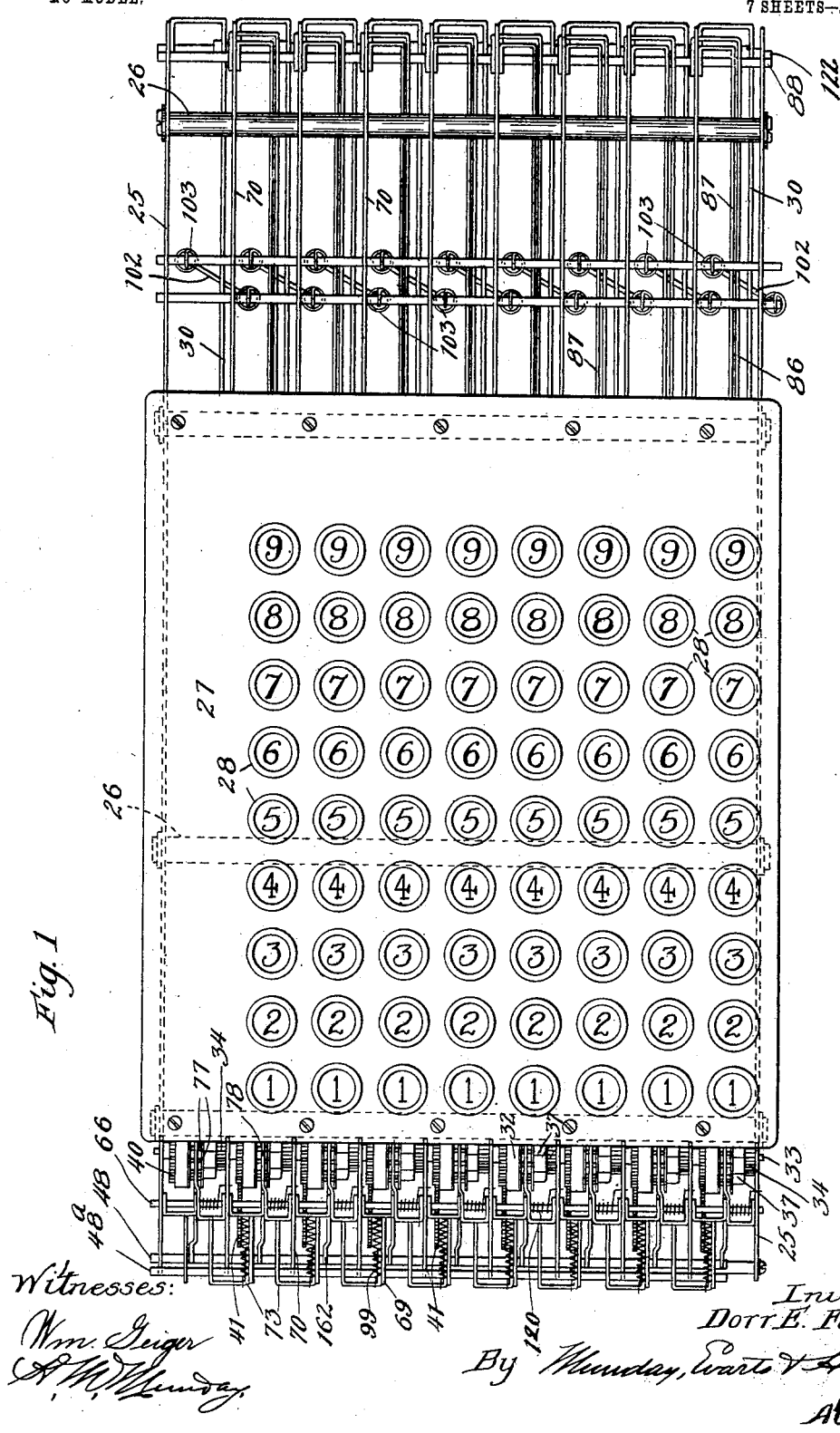

No. 762,520. PATENTED JUNE 14, 1904.
D. E. FELT.
CALCULATING MACHINE.
APPLICATION FILED JUNE 29, 1903.
NO MODEL. 7 SHEETS—SHEET 1.

Witnesses:
Wm. Geiger
A. M. Munday

Inventor:
Dorr E. Felt
By Munday, Evarts & Adcock
Attorneys

No. 762,520. PATENTED JUNE 14, 1904.
D. E. FELT.
CALCULATING MACHINE.
APPLICATION FILED JUNE 29, 1903.
NO MODEL. 7 SHEETS—SHEET 2.
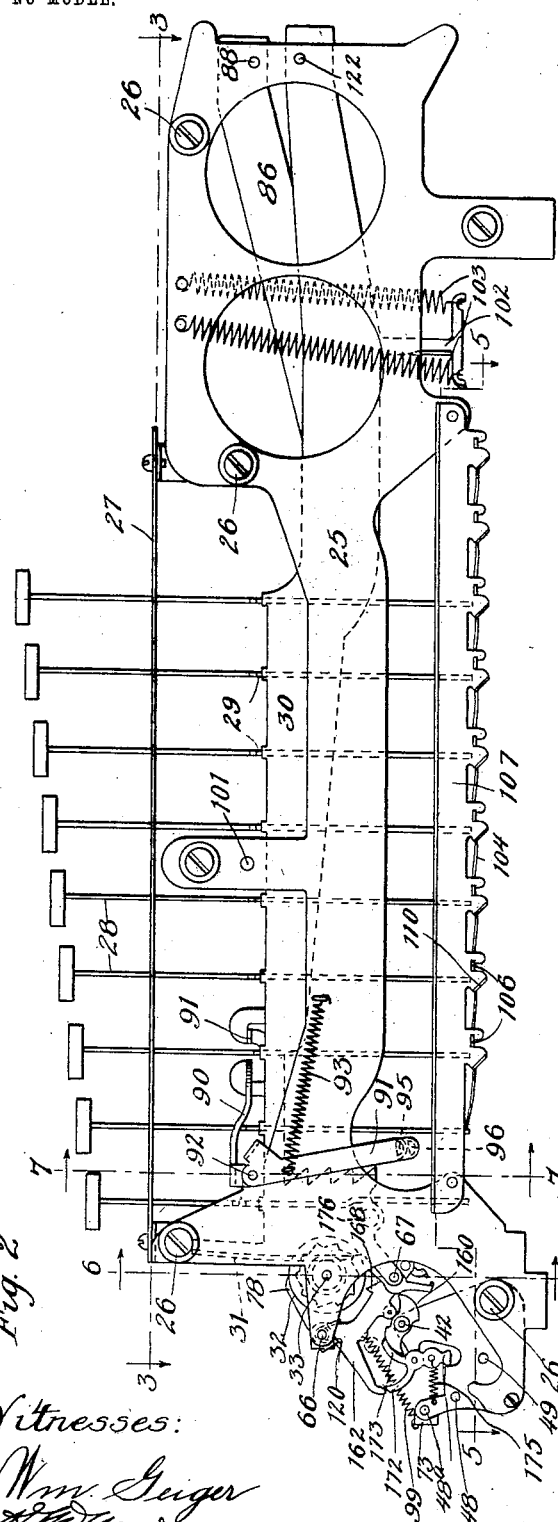
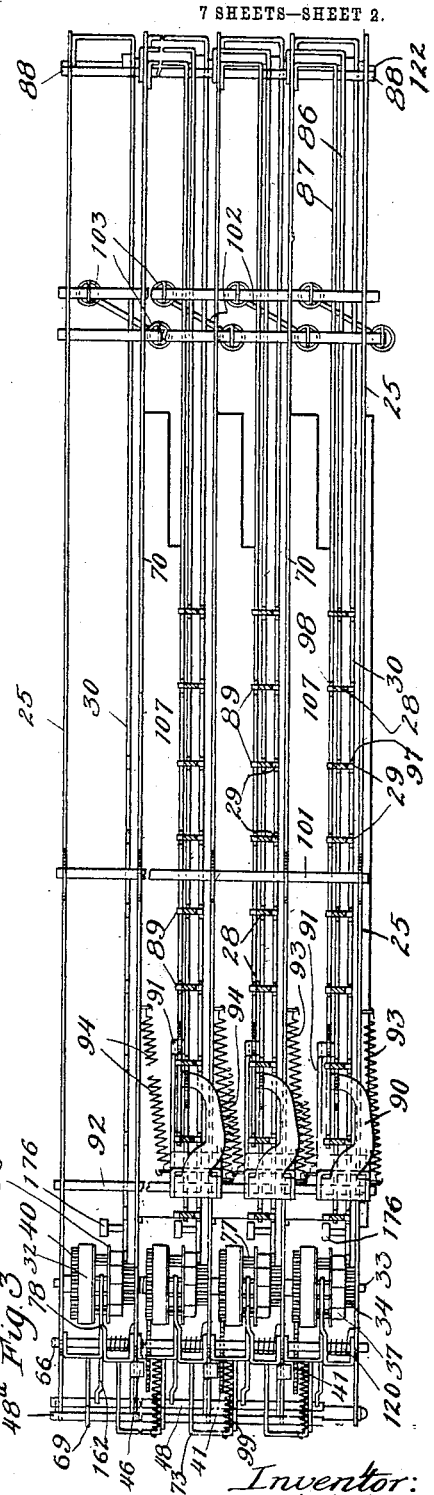
Witnesses:
Wm Geiger
A. M. Munday
Inventor:
Dorr E Felt
By Munday, Evarts & Adcock,
Attorneys No. 762,520. PATENTED JUNE 14, 1904.
D. E. FELT.
CALCULATING MACHINE.
APPLICATION FILED JUNE 29, 1903.
NO MODEL. 7 SHEETS—SHEET 3.

Witnesses:
Wm Geiger
A. W. Munday

Inventor:
Dorr E. Felt
By Munday, Evarts & Adcock
Attorneys

No. 762,520. PATENTED JUNE 14, 1904.
D. E. FELT.
CALCULATING MACHINE.
APPLICATION FILED JUNE 29, 1903.

NO MODEL. 7 SHEETS—SHEET 4.

Witnesses:
Wm. Geiger
A. W. Munday

Inventor:
Dorr E. Felt
By Munday, Evarts & Adcock,
Attorneys

No. 762,520. PATENTED JUNE 14, 1904.
D. E. FELT.
CALCULATING MACHINE.
APPLICATION FILED JUNE 29, 1903.
NO MODEL. 7 SHEETS—SHEET 5.
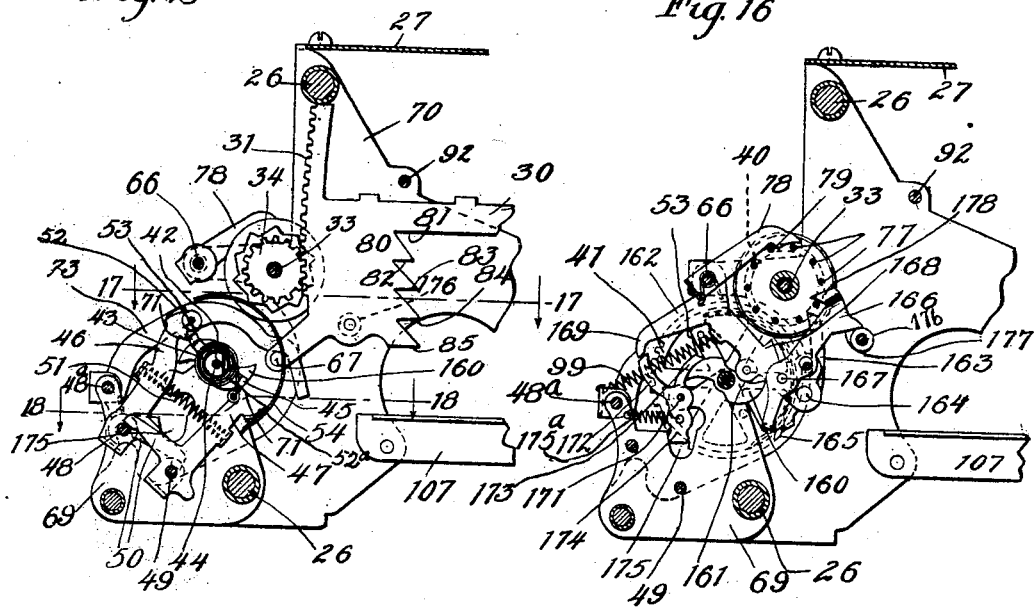
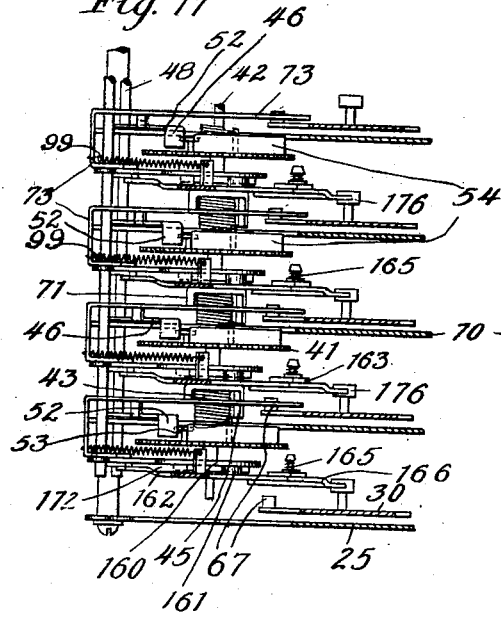
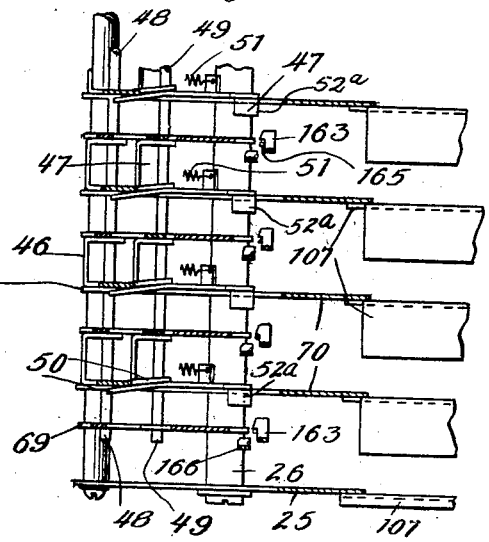
Witnesses:
Wm Geiger
H W Munday
Inventor:
Dorr E. Felt
By Munday, Evarts & Adcock,
Attorneys

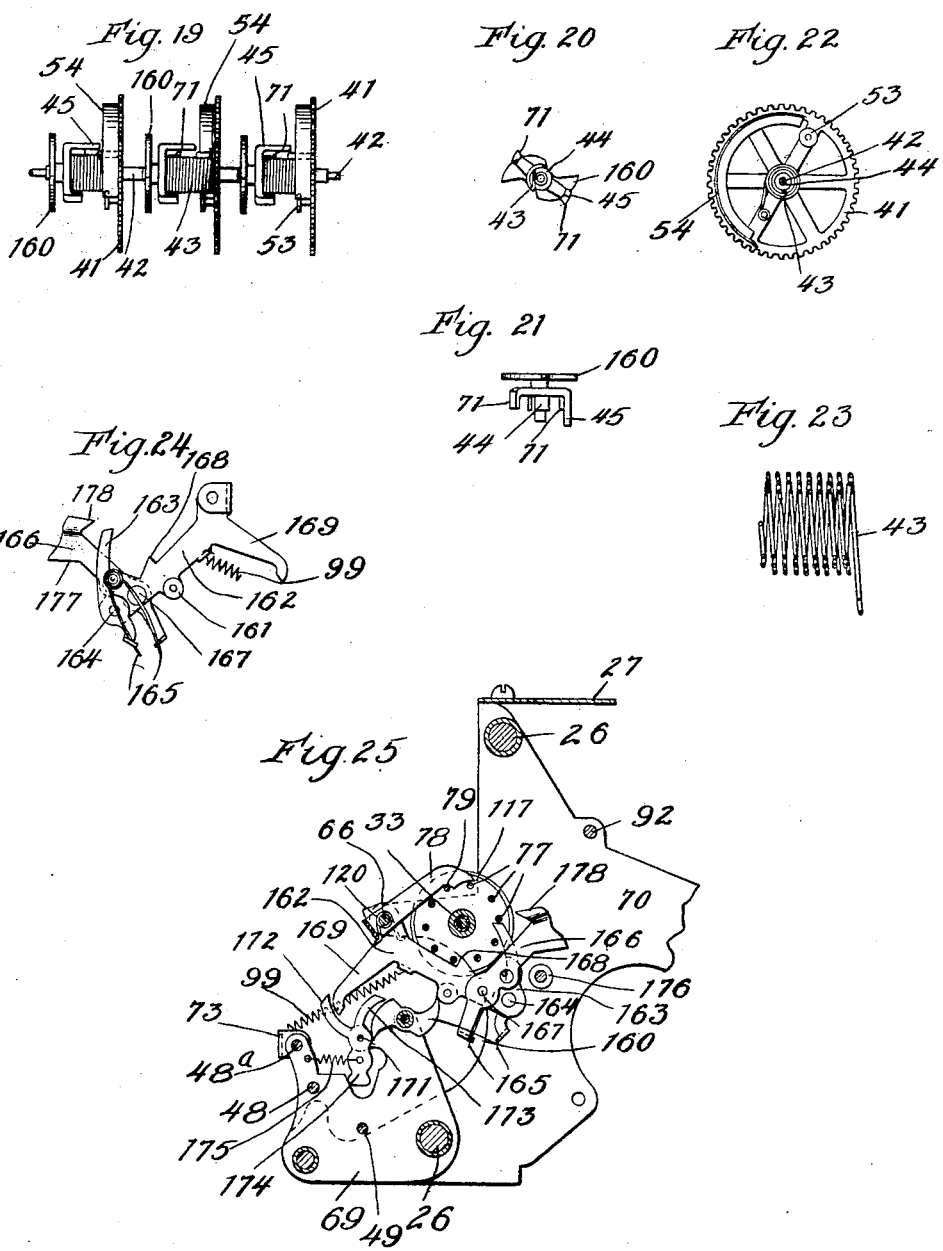

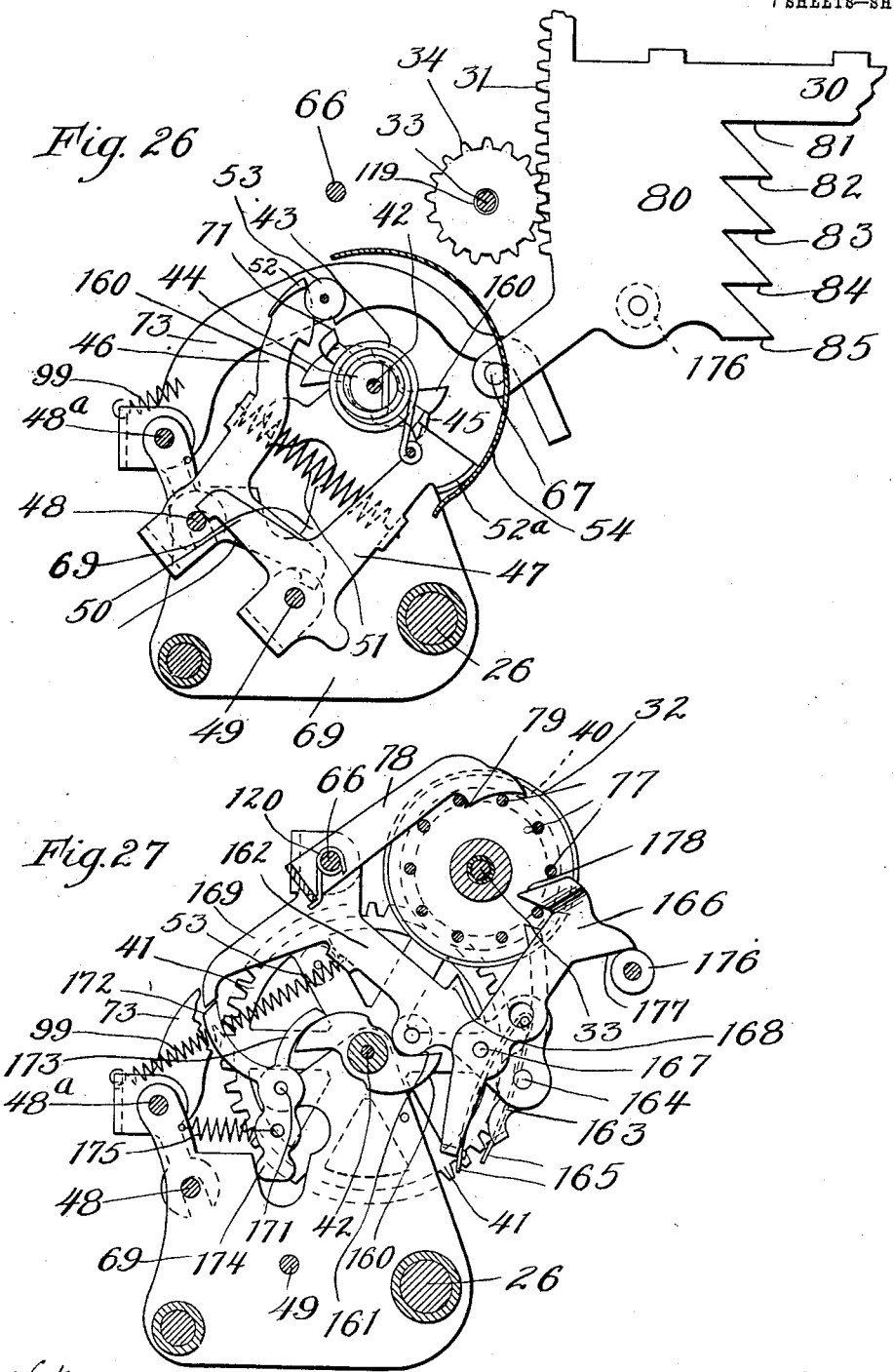

No. 762,520.

Patented June 14, 1904.

UNITED STATES PATENT OFFICE.

DORR E. FELT, OF CHICAGO, ILLINOIS.

CALCULATING-MACHINE.

SPECIFICATION forming part of Letters Patent No. 762,520, dated June 14, 1904.

Application filed June 29, 1903. Serial No. 163,488. (No model.)

*To all whom it may concern:*

Be it known that I, DORR E. FELT, a citizen of the United States, residing in Chicago, in the county of Cook and State of Illinois, have invented a new and useful Improvement in Calculating-Machines, of which the following is a specification.

This invention relates to the class of adding-machines of the general type shown in the patent granted to me on the 19th of July, 1887, and numbered 366,945, and in which the registering-wheels are actuated by the power exerted directly on the keys by the operator. Since the date of said patent I have been instrumental in the manufacture and sale of many such machines under the trade name of "Comptometer," and they have gone into extensive use in mercantile, manufacturing, and insurance offices and other places where numerous or complicated calculations have to be made. In all these comptometers the stroke of the key is short and light, as distinguished from the long and hard strokes of the keys in cash-registers and all other calculators which are operated by the direct action of the keys, and the registering-wheels are made small, and the mechanism is otherwise adapted to permit very much greater speed than is possible with any other form of calculators.

Notwithstanding the success achieved by the comptometers, they are open to one quite serious objection—viz., that while the touch is light as compared with other direct-key-operated machines, it nevertheless is sufficiently heavy to be objectionable and to render the operation hard on the finger-tips.

The main feature of the machine as heretofore constructed, which renders it thus hard to operate, is the power consumed in overcoming the friction of the transmitting mechanism. This friction, which is by no means peculiar to my machines, but is present in all direct-key-operated machines having more than four or five denominational columns, I have now largely relieved or prevented by the present invention.

Another feature of the old machine consuming a large proportion of the power is the weight of the numeral-wheels, which were required to be very strong, because they were obliged to withstand the blow resulting from the momentum imparted to all the moving parts, including the column-actuators. As the key-strokes are very frequent and rapid, often occurring at the rate of four hundred or five hundred per minute in some kinds of work, as in multiplying, it will be seen that the wheels have been necessarily made much stronger than would have been requisite if this function had not been devolved upon them, and one of the main objects of the invention has been to relieve them of all strains except such as is involved in overcoming their own momentum, and as I now make the machine the wheels may be extremely light, because they are not required to receive the blow due to the momentum of any other part.

A third objection to this class of calculators has been that they are liable to add incorrectly if the operator strikes two or more keys of different denominations simultaneously, because under such circumstances the carrying is often lost in the movement imparted directly to the register-wheels by the keys, and by reason of this fact it has not heretofore been possible to operate the machines by striking a plurality of keys simultaneously. Obviously a machine in which correct results can be obtained by striking two or more keys in different denominational series at a time will enable the operator to increase the speed of his calculations very materially, and by my present invention I not only obviate all danger of miscalculations from this cause, but produce a machine well adapted to permit the habitual striking simultaneously of a plurality of keys.

In the comptometers the numeral-wheels have heretofore been arrested by detents, such as that shown at J' in my said patent, the same entering between equispaced wires *i*, also shown in the patent and bridging the open spaces between the numeral-wheels and their companion disks. There were ten of these wires, and when engaged by the detents they arrested not only the wheels, but the column-actuators as well. With this construction the detents must enter between the proper wires not only when the keys are operated slowly and produce a slow rotation of the wheels, but also when the keys are struck very hard and quick blows and produce a correspondingly-rapid movement of the wheels, and they must do this notwithstanding the springing of the levers and other parts due to the hard blows. Unless the adjustment of the mechanism is perfect, so that the machine works with the same accuracy with both slow and rapid strokes, the detents may not always enter the wires at the proper point, and thus destroy the usefulness of the machine. While I have heretofore succeeded in overcoming this objection, it has required very careful and painstaking adjustment by skilled men and has added considerably to the cost of manufacture. The necessity for this fine adjustment is due, as I conceive, to the fact that the wires are closely associated and pass the detents so rapidly that the latter do not always have sufficient opportunity to enter between the proper wires with absolute certainty and also in large measure to the yielding or springing of the actuators and other parts, which are of necessity made as light as possible. Obviously the amount of this springing varies with the force of the blows and with the position of the key which is struck relative to the acting end of the actuator. To provide a construction in which the fine adjustment referred to is not necessary has been one of the main objects of the invention. I accomplish this end by providing means acting directly on the column-actuators instead of the numeral-wheels, whereby to arrest them at the proper times, such means embracing stop devices and shoulders formed in the actuators, the shoulders being spaced apart and moving less rapidly than the wheels, so that they give the stops sufficient opportunity and greater opportunity to engage the proper shoulder with certainty than was afforded in the old construction.

The invention also embraces other features of invention of great importance, some of which assist in the lightening of the key touch and all of which will be fully understood from the description and drawings.

Figure 4:
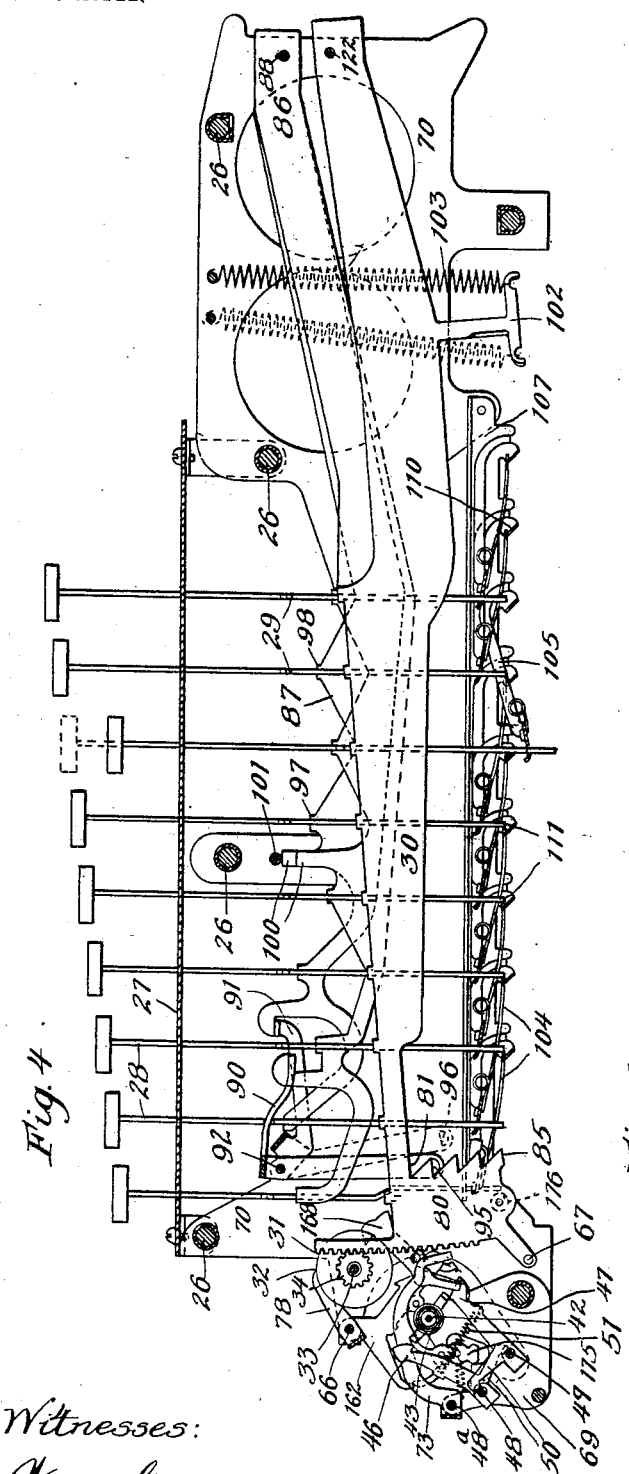
Figure 5:
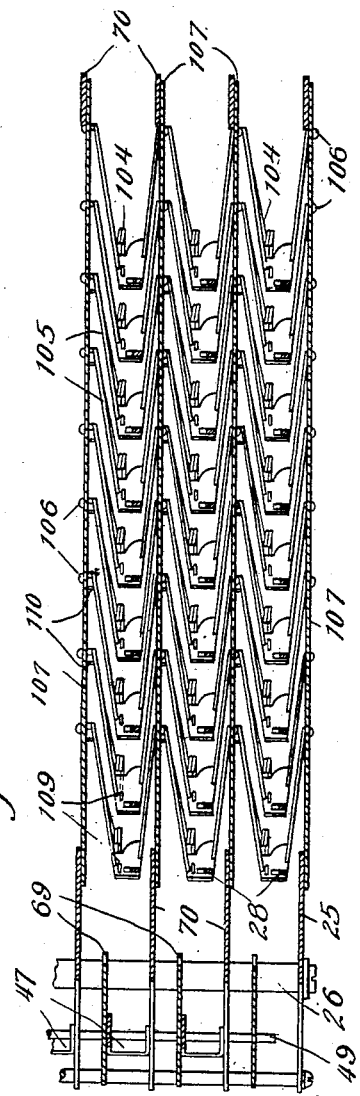
Figure 6:
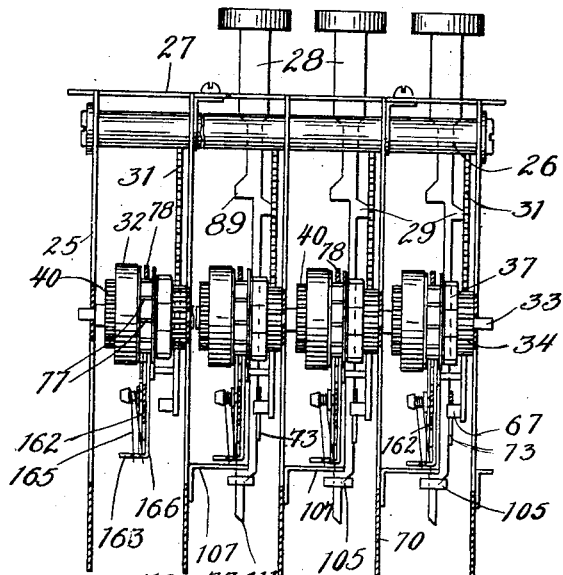
Figure 7:
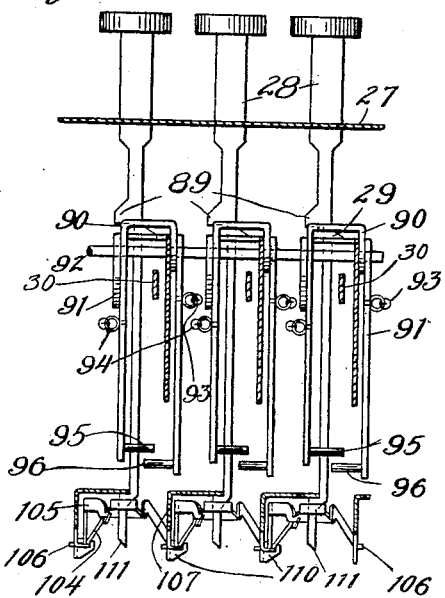
Figures 8, 9, 10, 11, 12:
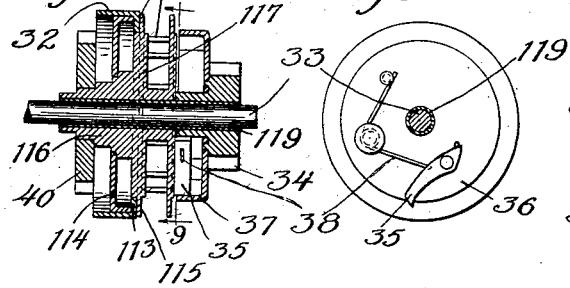
Figure 13:
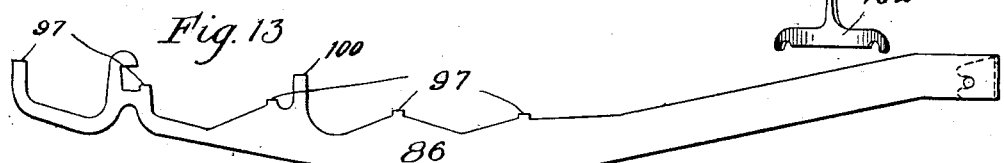
Figure 14:

In the drawings, Figure 1 is a plan view of the invention. Fig. 2 is a side elevation. Fig. 3 is a horizontal section on the line 3 3 of Fig. 2, the number of the columns being reduced. Fig. 4 is a longitudinal vertical section. Fig. 5 is a section on the line 5 5 of Fig. 2. Figs. 6 and 7 are sections on the lines 6 6 and 7 7, respectively, of Fig. 2. Fig. 8 is a section of one of the numeral-wheels and its accompanying parts. Fig. 9 is a section on the line 9 9 of Fig. 8. Fig. 10 is an inside view of the internal ratchet. Fig. 11 is a detail view of one of the key-retracting springs. Fig. 12 is a sectional view of one of the segment-levers. Figs. 13 and 14 are detail views in elevation of the stop-levers actuated by the keys. Figs. 15 and 16 are partial vertical sections in adjacent planes, showing the carrying mechanism. Figs. 17 and 18 are horizontal sections on the lines 17 17 and 18 18, respectively, of Fig. 15. Figs. 19 to 24 are detail views of portions of the mechanism, Fig. 23 being in section. Fig. 25 is a view similar to Fig. 16, showing the moving parts in a different position. Figs. 26 and 27 are enlarged views of most of the parts shown in Figs. 15 and 16.

In the drawings, 25 represents the side frames of the machine united by cross-bolts 26.

27 is the top-plate, through which the keys 28 extend.

69 represents vertical plates in the denominational spaces and supporting some of the moving parts, and 70 represents divisional plates arranged between the different denominational spaces. (See Fig. 5.) The keys are provided with side lugs 29, bearing on the levers 30, (same figure,) carrying toothed segments 31, through which the numeral or register wheels are actuated, the levers being those which I have generally designated by the term "segment-levers" in my previous patents and being, in fact, the column-actuators, and each is actuated by all the keys in the same denomination with it, the strokes of the keys varying in proportion to their power or value.

The numeral-wheels are shown at 32 and all are mounted loosely on the shaft 33. With each wheel is a pinion 34, also on shaft 33 and meshing with the corresponding toothed segment 31, and such pinion has a pawl-and-ratchet connection with its numeral-wheel. The pawl 35 of this connection is carried on the disk 36, which is rigid with the wheel, and the ratchet is an internal one and shown at 37 and is rigid with the pinion. The pawl is pressed constantly by the spring 38. The column-actuator turns the pinion when it descends and when it rises; but the pawl and ratchet prevent any turning of the numeral-wheel except during the rising movement of the actuator.

Adjacent to each numeral-wheel and fast on the same is a pinion 40, through which the carrying mechanisms are operated. These pinions mesh with carrying-gears 41 on a shaft 42, arranged parallel with the numeral-wheel shaft, and actuate said gears to an extent corresponding to the movement received by the numeral-wheels from the keys and from the carrying mechanisms. The gears 41 have, preferably, twice as many teeth as the pinions 40, and each is provided with a spring 43, one end of which is attached to the gear and the other end of which is attached to the sleeve 44 encircling shaft 42 and carrying the right-angle arm 45. The sleeve is permitted to rotate intermittently, as hereinafter stated, and the spring is wound up by the rotation of the gear 41, so as to store up the power necessary for operating the sleeve, the tension upon the spring being retained between the intermittent movements of the sleeve by the contact with arm 45 of the alternately-engaging detents 46 and 47, which are normally in the path of the arm. Although they are differently formed they both are adapted to arrest the arm. The detents are independently mounted upon separate shafts 48 and 49, and each has a foot or right-angular extension 50 bearing on the shaft of the other and limiting its movement in one direction. A spring 51 unites the free ends of the two detents, so that they are both adapted to yield to the slight extent necessary to release the arm 45. Aside from this they have no movement.

Each of the detents 46 and 47 carries a laterally-projecting ear, that upon detent 46 being indicated by 52 and that on detent 47 by 52$^a$, and such ears are normally in the path of a dolly-roll 53 on the side of the carrying-gear 41. When the roll encounters either of said ears, it lifts or moves the detent to which the ear is secured out of the way of the arm 45, and thus allows the sleeve to turn a half-revolution under the power of its spring 43, the sleeve being arrested by the engagement of the arm 45 with the opposite detent. These operations of the sleeve are coincident in point of time with the arrival of the corresponding numeral-wheel at the zero position. The carrying-gear is provided with and carries a curved guard 54 opposite the roll 53 and located far enough out from the axis to enable it to pass outside the ears 52 of the detents, and it extends about half-way around the gear, so that when one of the detents is being operated or displaced by the roll the other is confined by the guard and does not lose its position when it is struck by the arm 45. This guard also acts to prevent any possibility of the arm 45 avoiding arrest by the confined detent by insuring the proper position of the latter, and this is the main purpose of the guard, and it thereby positively limits the operations of the sleeve to half-rotations. The sleeve 44 also carries two oppositely-projecting cam-arms 160 160. (Best shown in Figs. 16, 20, and 21.) Normally when either detent 46 or 47 is in engagement with arm 45 of the sleeve, as shown in Fig. 15, the cams stand in the position shown at Fig. 16. In this position a dolly-roll 161, attached to the swinging lever 162, pivoted on a cross-rod 66, rests against the hub of the cam-arms and in proximity to the concaved side of one of those arms. The lever 162 carries on its extreme end the carrying-pawl 163, pivoted at 164 and provided with a spring 165, acting to press the upper end of the pawl into engagement with the wires 77, secured in the side of the numeral-wheel. Said lever also carries at its outer end detent 166, pivoted at 167 and acting to prevent overthrow when the wheels are actuated by the keys. This detent is also acted on by the spring 165, one limb of which is engaged by pawl 163 and the other by the detent 166. The spring tends to keep the detent out of engagement, but is normally overcome, as will be understood later on. Lever 162 is provided on its upper edge with a stop projection 168, adapted to enter between the wires 77 at the completion of each carrying operation. At the other side of its pivot the lever 162 carries an arm 169, the function of which is explained below. A spring 99 acts on lever 162, its other end being secured to the base end of a latch 73, fully described hereinafter, and draws the long end of the lever downward, as will be understood from Fig. 16.

At 171 in the plates 69 is located the pivot of a three-armed detent 172, 173, and 174. The arm 172 of this device contacts with arm 169 of lever 162, the arm 173 contacts with and is operated by the cam-arm 160, and the arm 174 extends into a slot 175, formed in the supporting-plate, and thereby limits the movements of the other two arms. A spring 175$^a$ returns this detent to normal position.

Each column-actuator carries a dolly-roll 176 in such position that the roll will contact with the inclined under edge 177 of the detent 166 when the actuator returns to its normal position after being operated by the keys, the effect of such contact being to overcome the spring 165 and press the hook 178 of the detent between the wires 77.

The spring 43 is of peculiar construction, and as shown consists of three series of concentric and integral coils, one outside of another. In the manufacture of this spring the inner series of coils are first formed, then the second series are formed, the wire being led in the reverse direction from the direction of the first series, and the largest or outer series are then formed, the wire being again reversed and directed in the same way as in coiling the first series. This spring exerts practically the same amount of power at the end that it has at the beginning of its operation, and may be made of the round wire generally known as "piano-wire," and is equally efficient with the flat metal spring heretofore used without having the marked tendency to break to which the latter is peculiarly subject.

When the spring 43 is permitted to act by the release of either of the detents 46 47 and the sleeve 44 is given a half-turn, the arm 45 moves into engagement with the other detent and the cam-arms reverse their positions. In this movement one of the arms 160 throws the three-armed detent, so that arm 172, which normally holds lever 162 against movement, passes out from under arm 169 and leaves lever 162 free to swing when the dolly-roll 161 rides up and over the same cam-arm which displaces the detent 172. In the initial part of the rotation of the sleeve said dolly-roll rides upon a concentric part of the hub of the cam-arms, and consequently no movement is imparted to lever 162 until the roll reaches the base of the cam. The cam now lifts the long arm of the lever, and in so doing the carrying-pawl imparts the carrying movement to the numeral-wheel. The detent does not interfere with this operation of the numeral-wheel, because it moves in unison with the carrying-pawl. While the movement is progressing, however, the detent is freed in a measure from the control of dolly-roll 176 and allows the spring 165 to gradually force the detent out of its engagement with pins 77, so that when the lever 162 drops back the hook 178 will pass into position opposite the next space between the pins 77 and be forced into said space by the dolly-roll 176. The return of lever 162 occurs as soon as dolly-roll 161 passes off the cam-arm and enters the concave side thereof, the long arm of lever 162 being then drawn down by spring 99, carrying the pawl and detent with it, and this results in the lever being again locked by arm 172 and the detent entering the next succeeding space between the wires 77 of the numeral-wheel and again locking the wheel, as above described, the downward movement of the detent causing this action by it by reason of the contact of incline 177 with dolly-roll 176.

It will thus be noted that the detent normally locks the numeral-wheel and releases it only when the column-actuator is depressed by the key and momentarily during the carrying operations, and in this respect my invention differs from machines previously made, in which the wheels are usually unlocked at 8 and 9. It will be understood that the locking projection 168 acts in conjunction with detent 178 in locking the numeral-wheel after the carrying operations and insures prevention of overrotation in carrying. It locks only when the lever 162 is lifted, as already described, and releases by the return of that lever.

It will be noticed that the detent and locking projection are neither of them called upon to do more than to arrest the numeral-wheel, the column-actuator being arrested by other means independent of the wheels, slightly in advance of the arrest of the wheel, as hereinafter more fully explained, so that the lever 162 is called upon to withstand only slight shocks and the wheel itself is permitted to be made very light as compared with those heretofore used.

In order to prevent the loss or swallowing of the carrying movements in the other and generally larger movements of the numeral-wheels received from the impulses of the keys, which would occur if the carrying took place simultaneously with the key movements, I have devised means whereby the operation of the carrying mechanism of the different denominations is caused to take place between the key-strokes in the same denominations and after such strokes have been completed and the numeral-wheels have moved in accordance therewith. This feature of the invention will now be set forth. The sleeve 44 is also provided at opposite sides, as shown at Fig. 21, with two projections 71, each adapted to engage the under edge of a latch 73, pivoted on the cross-rod 48$^a$. The latch is extended over and rests on the column-actuator of the denomination to which the carrying is to be done, and preferably on the pin 67 on the actuator, and a spring 99, already mentioned, draws the latch over onto the actuator. Normally the latch is out of engagement with the projections 71; but when any key of the column to which the carrying is done is struck the actuator of that column moves down, so that the latch drops into position, where it must engage the first or nearest one of the projections 71 as soon as the sleeve begins to turn. The sleeve is thus arrested before it gets fairly started or has performed any function and continues to be held by the latch until the column-actuator has fully completed its upstroke after being depressed by a key. When the actuator thus returns to its normal position and as it arrives at the same, it lifts the latch through the contact of the pin 67 with the end of the latch, so that the engagement with the sleeve is terminated, leaving the sleeve free to turn under the power of the carrying-spring 43 and through the mechanism already described to operate its numeral-wheel through a one-tenth revolution.

A further peculiarity of the carrying mechanism should here be referred to. Suppose the numeral-wheels of adjacent denominations are standing so as to indicate "29," in which case of course the power necessary for a single carrying from the lower wheel to the next higher one will have been stored up in the carrying-spring of the former. If now "39" more is added to the "29" already on the wheels by touching two keys simultaneously, the carrying-spring (or other motor of the carrying mechanism) before it has let off any of the power previously stored in it will be compelled to receive and store up in addition enough or nearly enough power for a second carrying, because it will be remembered that the first carrying does not take place under the law of the machine until after the keys depressed in adding the "39" have fully completed their strokes, so that it will be seen that the carrying-motor, whether it consists of a spring or some other form of motor, must necessarily be capable of storing up power nearly sufficient for two carrying operations, and not only must the motor be thus capable of storing up power for a plurality of carrying operations, but it must also be capable of retaining the power for the second carrying when it gives up the power required in the first one, or, in other words, the motor must not be of a kind which will part with all its power at once, but must retain the excess power possessed by it at the time of any carrying operation and hold such excess in reserve for the next operation. Because of its adaptability to the location and its ability to receive and store up power for two successive operations, and its ability to retain the excess power I prefer to employ the spiral spring (shown at Fig. 23) already described or some similar construction as the carrying-motor; but of course I do not wish to be limited thereto.

Another important feature of the machine may be here noticed. All operations of the numeral-wheel, whether caused by actuations received direct from the keys or from the carrying mechanism, take place against the restraining power of a spring—in this instance the spring 43—and each operation of the wheel winds up that spring, and thereby enables it to operate the carrying mechanism. In other words, the wheel is always under restraint by a spring whose tension is practically uniform, and consequently the tendency to overrotate is very greatly lessened. The spring further acts to soften the blow of the wires 77 on the detent-hook 178 and generally to soften the arrest of the actuators and free the machine of much of the shock and jar which have heretofore attended its use and render its operation comparatively smooth, easy, and free from noise.

Mounted on the cross-rod 66 is the detent 78, adapted to ride on the wires 77 when the numeral-wheels move forward, but having a shoulder 79 adapted to engage the wires in case of any backward rotation. This device is clearly shown at Fig. 16.

Referring now to the features by which the numeral-wheels are relieved of the labor of arresting the momentum of the column-actuators and by which the careful adjustments to prevent over-rotation of the numeral-wheels under quick blows of the keys are rendered unnecessary, on a vertical portion 80 of the column-actuators, and preferably on the rear edge of the segments thereon, I form a series of shoulders 81, 82, 83, 84, and 85, which are preferably in the form of ratchet-teeth and are best shown at Fig. 15. Adjacent to each actuator are two vibrating or swinging levers 86 and 87 (seen in detail at Figs. 13 and 14) and both pivoted on the cross-rod 88 at the rear of the machine. These levers are engaged and depressed by projections 89, formed on the keys, the projections on the odd-number keys engaging the lever 86 and those on the even-number keys engaging the lever 87, and each lever is adapted to swing a pivoted stop and cause it to engage the shoulders of the corresponding actuator. These stops are shown at 90 and 91, and they are practically elbow-levers pivoted upon a cross-rod 92, and each is provided with its own retracting-spring 93 and 94, such springs serving also to raise the levers 86 and 87. The vertical members of the stops carry teeth 95 and 96, extending horizontally and laterally therefrom and in front of the shoulders 81 82, &c., the tooth 96 being in a lower plane than the tooth 95, (see Fig. 7,) so that they allow different amounts of movement. Each stop has also a member extending horizontally toward the rear of the machine, and these horizontal members are engaged by the points of the gooseneck ends of the levers 86 and 87, the levers 86 engaging the stops 90, as seen at Fig. 2, and the levers 87 engaging stops 91, as seen at Fig. 4. The teeth 95 and 96 are preferably flat on top and rounded on their under surfaces, as I find they are thereby well adapted to the ratchet-like shoulders 81 82, &c., as they have some slight wedging action and at the same time disengage themselves easily at the proper time. The points on the lever 86 engaged by the projections of the keys are indicated at 97, and those on lever 87 are indicated at 98. With this construction if the "1" key is depressed the stop-tooth 95 will be positioned under the lowest shoulder 81, and thus arrest the downstroke of the column-actuator as soon as the actuator has moved a distance sufficient to enable it to give a tenth of a revolution to the numeral-wheel on its return stroke. If the "2" key be depressed, the tooth 96 will be carried under the same shoulder 81, and thus arrest the actuator; but this arrest takes place later than that caused by the "1" key, so that the actuator is permitted to move far enough to give a two-tenths revolution to the numeral-wheel on the upstroke. The depression of the "3" and "4" keys causes similar results, the difference being that the stop-teeth then engage the second shoulder 82 on the actuator instead of the first and allow a correspondingly greater movement of the actuator. The depressing of keys 5 and 6 causes similar engagement with the third shoulder 83, with a corresponding increase in the movement of the actuator. The keys 7 and 8 cause engagement with shoulder 84 and the "9" key with shoulder 85, each giving increased range of movement to the actuator and the even key in each case allowing greater movement than the odd key engaging the same shoulder therewith. It will be noticed in this construction that the shoulders 81 82, &c., are spaced relatively wide apart, so that the stop-teeth 95 and 96 are given ample time to engage the proper shoulder, even if the actuator is moving rapidly, and that by employing the two stop devices, each for a portion of the keys instead of a single one for all the keys, I am able to correspondingly widen the shoulder-spaces. It will also be noticed that the shoulders 81 82, &c., and the stop-teeth 95 and 96 sustain the full force which may be upon the actuator from the operator's hand at the time of the arrest and also such force as may be due to the momentum of the actuator, thereby relieving the numeral-wheel entirely therefrom.

In my present invention I actuate the numeral-wheels during the upstrokes of the actuators instead of during the downstrokes, as in my former patents, and I have described above the means employed for arresting the column-actuators when they have moved down to an extent proportioned to the power of the struck key, so that they may during their return strokes actuate the wheels in precise accordance with the power of the key. On the return strokes the actuators are all arrested by the bar or bolt 26, located immediately above the segment ends of the actuators. This bolt extends across the machine, so that it arrests all of the actuators when they have moved up to a common plane. This arrest of the actuators takes place slightly in advance of the arrest of the corresponding numeral-wheels in order that the momentum of the actuators may be overcome by the time the wheels are arrested and so that the wheels may not be under the impelling power of the actuators at that time and require no more than the overcoming of their own momentum by the levers 166. This difference in the timing of the two operations is so slight that it cannot be indicated in the drawings; but it enables me to use the very light numeral-wheels herein shown.

The levers 86 and 87 have projections 100 on their upper surface adapted to encounter the cross-rod 101, and thus to limit the upward movements of the levers. The levers are arranged parallel with each other and close together and at one side of the column-actuator, and each is cut out on its upper edge opposite the points at which the keys engage the other of them, so as to permit each to move independently of the other. The column-actuators are provided each with a downward projection 102, preferably integral with the actuator and having its stem twisted sufficiently to cause the arms of the T to project upon each side, and to each of the arms I attach a lifting-spring 103, such springs having equal power. In this way I avoid any twisting or torsional action upon the actuator such as would attend the use of a spring upon one side only.

The keys are lifted after each operation by springs 104, acting on V-shaped frames 105, located under the keys and fully shown at Fig. 11. The limbs of the frames 105 are provided with ears 106, which are inserted in notches in the bottom edge of stationary longitudinal supporting-bars 107, arranged in the divisional lines of the denominations and at the outside of the highest and lowest denominations. The frames are retained in the bars by the pressure of their operating-springs 104, which are secured at one end in openings 109 in the central or body portions of the frames, and their other ends rest on the bent-over lips 110, formed on the bars, the springs being coiled between their said attachment and said supports, so as to adapt them to support the frames and to lift the keys. The keys have right-angle bends near the bottom, which form shoulders adapted to rest on the body of the frames, and their points 111 pass through openings 112, formed in the frames. With this construction the keys are perfectly held and guided in their movements as well as lifted after being operated. The frames are formed of spring metal, and their limbs are somewhat compressed when they are entered between the bars, so that the ears cannot escape from the notches so long as the springs 104 are in place. The keys are readily removed by disconnecting the lifting-frames from them.

The numeral-wheels are of peculiar construction. Their rims are formed of celluloid or of other light material and are provided with internal flanges 113, which are gripped between the rims 115 of disks 117, mounted on the hub 116, and disks 114, also mounted on the hubs and having right-angle flanges pressing the flanges 113 against the rims 115. Each wheel is preferably provided with a separate bushing or sleeve 119 within its bore and around the supporting-shaft 33 and also extending into the actuating-pinion 34. I prefer that the disks 36 be in one piece with the hub 116.

The actuating of the levers 86 and 87 is not exactly coincident with the depressing of the column-actuators, but is delayed until near the end of the down key-stroke, as it is only necessary that the levers should swing in season to position the stops 90 and 91. This delayed action is secured by locating the engaging points 97 and 98 so that there will be no contact by them with the keys until the proper time.

The internal ratchet 37 and its outwardly-pressed pawl 35 are much to be preferred to the exterior ratchet and inwardly-pressed pawl which they replace. In the case of the latter a heavy spring is required to insure action by the pawl, especially on the first tooth, and this creates considerable friction and renders the key touch hard. In the new construction a comparatively light spring is used without endangering the engagement of the pawl with the first tooth of the ratchet, and this result is due to the fact that the light spring is reinforced by the outwardly-acting centrifugal force. The light spring relieves much of the friction present with the old construction.

The detents 78 are held down on the pins 77 by springs 120. The column-actuators are all pivoted at their rear ends, as shown at 122. The springs 93 and 94 are attached at their ends to the divisional plates 70.

I have shown herein the details of the registering mechanism employed by me in my improved calculating-machine; but such features of it as are not claimed herein are reserved for a divisional application filed December 10, 1903, as Serial No. 184,563.

I claim—

1. The combination with the keys and the column-actuators operated by the keys and provided with coarse spaced teeth, projections or shoulders, 81, 82, &c., of two hinged levers arranged alongside of the actuator, one of said levers being depressed by one portion of the keys and the other by the remaining keys, and two swinging stops, one for each of said levers, the stops engaging the shoulders 81, 82, &c., when operated by their respective levers.

2. The combination with the keys and the column-actuators operated by the keys and provided with coarse spaced teeth, projections or shoulders 81, 82, &c., of two hinged levers arranged alongside of the actuator, one of said levers being depressed by the odd keys and the other by the even keys, and two swinging stops each actuated by one of said levers, and serving to engage said shoulders, one of said stops being located in a lower plane than the other.

3. The combination with the keys and the column-actuator operated by the keys and provided with coarse spaced teeth, projections or shoulders, of two hinged levers arranged alongside of the actuator, one adapted to be depressed by the odd keys and the other by the even keys, and two pivoted stop devices adapted to be swung each by one of the levers, and thereby to be forced into engagement with said shoulders 81, 82, &c., the acting portions of said devices being located in different planes so one may engage later than the other.

4. The combination with the denominational series of keys and the denominational column-actuator depressed by the keys and provided with a series of coarse spaced teeth, projections or shoulders, of denominational stop devices each engaging a plurality of said teeth, projections or shoulders and positioned by power from the keys.

5. The combination with the denominational series of keys and the denominational column-actuator depressed by the keys, and provided with the shoulders 81, 82, &c., of two denominational movable stops each engaging a plurality of said shoulders, and levers actuated by the keys and serving to operate the stops.

6. The combination with the keys and the column-actuator operated by the keys, and provided with the shoulders 81, 82, &c., of two movable stops engaging said shoulders, and two levers one of which is actuated by the odd keys and operates one of the stops, and the other of which is actuated by the even keys and operates the other of the stops.

7. The combination with the keys and the column-actuator operated by the keys, and provided with the shoulders 81, 82, &c., of two movable stops engaging said shoulders, and two levers arranged in the denominational line, one being operated by the odd keys and actuating one of the stops and the other being operated by the even keys and actuating the other stop.

8. The combination with the keys and the column-actuator operated by the keys and having a series of coarse spaced teeth or shoulders, of two stop devices moved into engagement with said teeth or shoulders under the power of the keys, one portion of the keys operating one of said devices, and the other keys operating the other device.

9. The combination with the keys and the column-actuator operated by the keys and having a series of coarse spaced teeth or shoulders, of two stop devices moved into engagement with said teeth or shoulders under the power of the keys, one portion of the keys operating one of said devices, and the other keys operating the other device, and one device being lower than the other so that it acts later.

10. The combination with the denominational series of keys and the column-actuator of the same denomination operated by the keys and having a series of five coarse spaced teeth or shoulders, of two denominational stop devices movable into engagement with said teeth or shoulders, and operated at different times by the different keys and arresting the actuators at different positions.

11. The combination with a series of denominational numeral-wheels, a series of digital keys, for imparting downward movements to column-actuators proportioned to the power of the keys, vibrating column-actuators serving on their upstroke to operate the wheels, means independent of the wheels for arresting the actuators at the conclusion of the downstrokes, and means for arresting the wheels after the arrest of the actuators.

12. The combination with a series of denominational numeral-wheels, a series of digital keys, for imparting downward movements to column-actuators proportioned to the power of the keys, the column-actuators serving on their upstrokes to operate the wheels, means independent of the wheels for arresting the actuators at the conclusion of their downstrokes, and means for arresting the wheels at the conclusion of the upstrokes of the actuators.

13. The combination with a series of denominational numeral-wheels, a column-actuator for each wheel, a separate series of digital keys operating each actuator and acting to impart varying movements of the actuator and wheel in accordance with the power of the key which is struck, means for arresting the actuators at the conclusion of the downstrokes of the keys, and means for arresting the actuators at the conclusion of their return strokes.

14. The combination with a series of denominational numeral-wheels, a column-actuator for each wheel, a separate series of digital keys operating each actuator and acting to impart varying movements to the actuator and wheel in accordance with the power of the key which is struck, and means for arresting the wheels at the conclusion of the return strokes of the actuators.

15. The combination with a series of denominational numeral-wheels, a series of digital keys for imparting downward movements to column-actuators proportioned to the power of the keys, the column-actuators serving on their upstroke to operate the wheels, a stop independent of the wheels for arresting the column-actuators at the conclusion of their upstrokes, and means for arresting the wheels, the wheels being arrested after the actuators.

16. The combination with a denominational series of keys and a column-actuator adapted to receive varying amounts of movement from the keys and having a series of coarse spaced teeth or shoulders, of two movable stop devices engaging said teeth or shoulders at different levels, and means whereby the keys operate said stop devices.

17. The combination with a denominational series of keys and a column-actuator operated by the keys and having a series of coarse spaced teeth or shoulders, of two stop devices engaging said teeth or shoulders at different levels, and means whereby one portion of the keys may operate one stop device and means whereby the other portion of the keys may operate the other stop device.

18. The combination with a denominational series of keys and a column-actuator operated thereby, of means for arresting said actuator when it has moved a distance proportioned to the power of the key struck, such means consisting of shoulders or teeth on the actuator and two movable stops each adapted to engage the shoulders or teeth, and each controlled by a separate portion of the keys.

19. The combination with a denominational series of keys and a column-actuator operated thereby, of means for arresting said actuator when it has moved a distance proportioned by the power of the key struck, such means consisting of shoulders or teeth on the actuator and movable stops engaging said shoulders or teeth, one stop being controlled by the odd keys and the other by the even keys.

20. The combination with a denominational series of keys and a column-actuator operated thereby, of movable stops for arresting the actuator when it has moved a distance proportioned to the power of the key struck, one stop being controlled by the odd keys and the other by the even keys, and the actuator and stops being provided with projections, teeth or shoulders whereby they are adapted to engage each other at different points.

21. The combination with a denominational numeral-wheel, a series of digital keys, and a column-actuator operated thereby, of movable stops for arresting the actuator when it has moved a distance proportioned to the power of the key struck, one stop being controlled by the odd keys and the other by the even keys, and the actuator and stops being provided with projections, teeth or shoulders whereby they are adapted to engage each other at different points.

22. The combination with a series of denominational numeral-wheels, a column-actuator for each wheel operated directly by the keys, a series of digital keys for each actuator acting when struck by the operator to impart varying movements to the actuator and wheel in accordance with the power of the keys, a carrying mechanism for each wheel, and means for delaying the carrying operation in cases where the next higher wheel is rotated by its keys.

23. The combination with a series of denominational numeral-wheels, a column-actuator for each wheel operated by the keys, a series of digital keys for each actuator acting when struck by the operator to impart varying movements to the actuator and wheel in accordance with the power of the keys, an independent carrying mechanism for each denomination, and means for each denomination for delaying the carrying acting in cases in which the next higher wheel is rotated by its keys.

24. In a calculating-machine the combination of a series of denominational wheels, a series of keys for each of said wheels by the striking of which they may be operated to register any number "1" to "9," transmitting mechanism whereby a complete revolution of any wheel will cause the wheel of the next higher denomination to make one tenth of a revolution, and means whereby the action of the transmitting mechanism is delayed in cases in which the wheel of the higher denominations has been actuated by its own keys.

25. In a calculating-machine the combination of a series of denominational numeral-wheels, a series of digital keys for each of said wheels by power from which they may be varyingly operated to register any number represented by the keys, carrying mechanism for the several wheels whereby a complete revolution of any wheel causes the wheel of the next higher denomination to make one-tenth of a revolution, and means whereby the carrying mechanisms are prevented from acting in cases in which the higher wheels are actuated by their own keys.

26. The combination in a calculating-machine, of a series of denominational numeral-wheels, keys by the striking of which they may be independently operated to register any one of the nine digits, a carrying mechanism with each wheel, having its own motor-spring in which power is stored by the rotation of the wheel, and means whereby the operation of the carrying mechanisms will be delayed in cases in which the wheels which are to be actuated thereby are also moved by their own keys.

27. The combination in a calculating-machine of a series of denominational numeral-wheels, a series of keys for each wheel which when struck by the operator operate them varyingly to register the nine digits, a carrying mechanism with each wheel having its own motor-spring, and means in each denomination whereby the several carrying mechanisms are prevented from operating in cases where key-strokes occur in the denominations to which the carrying is to be done, until after said strokes are completed.

28. The combination in a calculating-machine of a series of denominational numeral-wheels, a series of keys for each wheel actuating them varyingly to register the nine digits, a carrying mechanism with each wheel embracing a carrying-gear operated by the wheels and a motor-spring wound by the turning of said gear, and means whereby said spring may be released and operate the carrying mechanism after the next higher wheel has been operated by its keys.

29. The combination of a series of denominational numeral-wheels, a series of column-actuators operating said wheels, a series of keys for each actuator, and a carrying mechanism for each wheel, and means whereby the several carrying mechanisms may be temporarily controlled by the next higher actuators.

30. The combination of a series of denominational numeral-wheels, a series of column-actuators operating said wheels, a series of keys for each actuator, and a carrying mechanism for each wheel, and means whereby the actuator of a higher denomination may delay the carrying from a lower denomination until it has completed any movement imparted to it by the keys.

31. The combination of a series of denominational numeral-wheels, a series of column-actuators operating said wheels, a series of keys for each actuator, and a carrying mechanism for each wheel, a latch 73 for each denomination, a projection on each actuator normally lifting said latches from their acting positions, and means whereby said latches may delay the carrying when lowered by the actuators.

32. The combination of a series of denominational numeral-wheels, a series of column-actuators operating said wheels, a series of keys for each actuator, and a carrying mechanism for each wheel, a latch 73 for each denomination, means whereby the actuators normally lift said latches from their acting positions, and means whereby said latches may delay the carrying when lowered by the actuators.

33. The combination of a series of denominational numeral-wheels, a series of column-actuators operating said wheels, a series of keys for each actuator, a carrying-gear for each wheel in mesh with a pinion carried by the wheel, a spring for each gear wound up by the same, and serving when released to operate the next higher wheel, and means whereby the next higher actuator may control said spring until it has been operated by its own keys.

34. The combination of a series of denominational numeral-wheels, a series of column-actuators operating said wheels, a series of keys for each actuator, and carrying mechanism for each wheel consisting of a carrying-gear in mesh with a pinion carried by the wheel, a spring for each gear wound up by the same, a sleeve on the gear-shaft operated by the spring, an arm 45 on the sleeve, detents engaging said arm alternately and permitting half-rotations by the sleeve and devices connecting said sleeve to the actuator of the next higher denomination.

35. The combination of a series of denominational numeral-wheels, a series of column-actuators operating said wheels, a series of keys for each actuator, and a carrying mechanism for each wheel operating the next higher wheel, such mechanism embodying a separate motor-spring for each denomination and connecting mechanism whereby the power of the spring is transmitted to the higher wheel.

36. The combination of a series of denominational numeral-wheels, a series of column-actuators operating said wheels, a series of keys for each actuator, and a carrying-gear for each wheel in mesh with a pinion fast to the wheel, a spring wound up by said gear, and mechanism whereby said spring may when released operate the next higher wheel.

37. The calculator having a carrying mechanism wherein are embodied the sleeve having intermittent semirotations, the arm upon the sleeve, the opposite detents alternately arresting the sleeve, the gear having a dolly-roll for releasing the detents, and a guard on the gear confining the detents in position to effect the arrest.

38. The combination in a calculator, of a series of numeral-wheels, and a series of column-actuators operating the wheels, each wheel and each actuator having its own independent arresting devices, so that the arresting device of neither is required to arrest the other.

39. The combination with the numeral-wheels and separate column-actuators each operating one of the wheels, of means for arresting the wheels on the completion of the registering movement, and means independent of the wheels for arresting the actuators, the latter being timed to act in advance of the wheel-arresting means whereby the wheels are relieved of the duty of arresting the actuators.

40. The combination with the numeral-wheels, of column-actuators operating the wheels, and provided with their own arresting devices and thus relieving the wheels, and a detent for each wheel for preventing over-rotation, such detents being positioned and held in action by the corresponding actuator and released by a spring.

41. The combination with the numeral-wheel, the keys, and the column-actuators for operating the wheels, the actuators being provided with their own arresting devices and relieving the wheels, and a detent for each wheel for preventing overrotation, such detents being moved into and held in action directly by the corresponding actuator.

42. The calculator having in combination with the numeral-wheels, mechanism for carrying embracing motor-springs, means whereby the springs are wound from the numeral-wheels, rotatable devices operated by the springs, detents controlling said devices and means for releasing the detents at each revolution of their respective wheels.

43. The combination with means for moving the numeral-wheel of a higher denomination to register a carried number, of a motor-spring put under tension by the numeral-wheel of the lower denomination, said lower wheel acting to register any of the digital numbers, means for controlling said spring so that it is released only after the actuator of the higher denomination has registered its key actuations in cases where it receives such actuations, and said wheels.

44. The combination with means for moving the numeral-wheel of a higher denomination to register a carried number, and said wheel and its column-actuator, of a motor-spring put under tension by the wheel of the lower denomination, said lower wheel, and means for controlling said spring released by the said actuator of the higher denomination.

45. The combination with means for moving the numeral-wheel of a higher denomination to register a carried number, and said wheel and its column-actuator, of a motor-spring put under tension by the numeral-wheel of the lower denomination, a sleeve operated by said spring, a latch controlling the movements of the sleeve when two keys are struck simultaneously and said lower wheel, the latch being released by the actuator of the higher denomination.

46. The calculator embodying a series of denominational carrying mechanisms each provided with its own motor, which is adapted to permit the storing of power in excess of the amount required for a carrying operation, and means with each carrying mechanism for delaying the operation of the mechanism until the completion of the actuation due to the keys of the wheel to be carried.

47. The calculator embodying denominational carrying mechanisms each provided with its own motor, which is adapted to permit the storing of power in excess of the amount required for a carrying operation, and with means for delaying the operation of the mechanism until after the numeral-wheel corresponding to the carrying mechanism has passed the zero-point.

48. The combination with two denominational numeral-wheels and their actuating-keys, of a carrying mechanism for carrying from one of said wheels to the other, said mechanism being provided with a motor put under tension by the lower wheel and adapted to store power in excess of that required for a single carrying, and means for delaying the carrying until after the higher wheel has been actuated by its keys in cases where such actuation occurs.

49. The combination with the column-actuator and the numeral-wheel, of a pinion in mesh with the teeth of the actuator and a pawl-and-ratchet connection between the pinion and the numeral-wheel, said ratchet being an internal one and the pawl being urged into engagement with it by the centrifugal force.

50. The combination with a plurality of denominational series of keys, of spring-impelled hinged lifting-frames, a separate and independent frame for each key of each denomination, and stationary supports for said frames.

51. The combination with the keys of the lifting-frames, one for each key, the springs acting on the frames, and the notched bars in which the frames are pivotally held.

52. The combination with the keys of V-shaped lifting-frames having ears, the bars having notches receiving said ears, and the springs holding the frames in position and also furnishing the lifting power.

53. The combination in a calculator, of a series of numeral-wheels, a column-actuator for each wheel, a series of digital keys for each actuator imparting varying movements thereto, stop devices arresting the actuators at the end of the downstrokes, a stop arresting the actuators at the end of the upstroke, and means for arresting the wheels timed to act after the actuators have been arrested in their upstrokes.

54. The normally locked numeral-wheel, and the keys operating the wheel, in combination with a detent for locking it, and means whereby said detent releases the wheel when the wheel is actuated from the keys, the detent moving with the wheel in the carrying.

55. The combination with the numeral-wheel and the column-actuator therefor of a carrying device and a locking device for locking the wheel normally and for arresting it when actuated by the column-actuator, both said devices moving in unison in the carrying operation.

56. The combination with a numeral-wheel and the column-actuator therefor of a carrying device and a locking device arresting it when actuated by the column-actuator, both said devices having the same lifting device and moving together in the carrying operation.

57. The combination with the numeral-wheel and the column-actuator therefor of a carrying device and a locking device for preventing overrotation under the impulse of the column-actuator, both said devices moving together in the carrying operation and the locking devices being withdrawn from the wheel during the operation.

58. The combination with the numeral-wheel and the column-actuator therefor, of the lever 162, the carrying-pawl and locking-detent for preventing overrotation under the impulse of the column-actuator, both mounted on said lever, and means for actuating the lever.

59. The numeral-wheel and the column-actuator therefor in combination with a detent serving to prevent overrotation under the impulse of the column-actuator and to normally lock the wheel, such detent moving with the wheel during the carrying.

60. The numeral-wheel and the column-actuator therefor in combination with a detent serving to prevent overrotation under the impulse of the column-actuator and to normally lock the wheel, of means for releasing such detent during the carrying.

61. The numeral-wheel and the column-actuator therefor in combination with a detent serving to prevent overrotation under the impulse of the column-actuator and to normally lock the wheel, such detent moving with the wheel during the carrying, and means for releasing such detent during the carrying.

62. The combination with the numeral-wheel and its column-actuator, of the locking-detent moving with the wheel in carrying and controlled by said actuator.

63. The combination with the numeral-wheel and its column-actuator, of the locking-detent forced into locking action by the actuator, and a lever supporting the detent.

64. The combination with the numeral-wheel and its column-actuator, of the locking-detent and a carrying-lever on which the detent is mounted, the detent being forced into engagement with the wheel by the actuator.

65. The combination with the numeral-wheel and its column-actuator, of the locking-detent and a movable support on which the detent is mounted, the detent being forced into action by the actuator, and moved out of action by a spring.

66. The combination with the numeral-wheel and its column-actuator, of the locking-detent, a movable support on which the detent is pivoted and with which it moves, and means for swinging the detent into and out of engagement with the wheel.

67. The combination with the carrying-lever to which the detent for locking the wheel is pivoted, and said detent, of the detent for locking the lever against action.

68. The combination with the carrying-lever and the detent for locking the wheel pivoted on the lever, of the detent for locking the lever against action, and means for releasing the lever from the detent.

69. The combination with the carrying-lever and the detent for locking the wheel pivoted on the lever, of the detent for locking the lever against action, means for releasing the lever from the detent, and means for operating the lever.

70. The combination with the numeral-wheel and its column-actuator, of a detent for locking the wheel, said detent being pivoted on a support having a rising-and-falling movement, and a device on the actuator for swinging the detent into the wheel.

71. The combination with the numeral-wheel and its column-actuator, of a detent for locking the wheel, said detent being pivoted on a rising and falling support and having a spring for swinging it out of action, and the actuator swinging it into action.

72. The combination with the numeral-wheel and its column-actuator, of a detent for locking the wheel, a carrying-lever having a rising movement and supporting said detent, a spring for swinging the detent in one direction on its support, and a device on the actuator for swinging the detent in the other direction.

73. The numeral-wheel normally locked against rotation, in combination with carrying mechanism directly effecting the release of the wheel temporarily during the carrying operation.

DORR E. FELT.

Witnesses:
H. M. MUNDAY,
EDW. S. EVARTS.